United States Patent Office 2,828,187
Patented Mar. 25, 1958

2,828,187

PREPARATION OF TITANIUM DIOXIDE

Arthur Wallace Evans, Middlesbrough, and William Hughes, Stockton-on-Tees, England, assignors to British Titan Products Company Limited, Billingham, England, a British company No Drawing. Application August 3, 1954
Serial No. 447,648

Claims priority, application Great Britain
August 6, 1953

8 Claims. (Cl. 23—202)

This invention is for improvements in or relating to the preparation of metallic oxides and has particular reference to the production of titanium dioxide by the oxidation of titanium tetrachloride in vapour phase.

In the prior art, many processes have been described in which the reaction between the titanium tetrachloride vapour and air or oxygen containing gases is conducted in a region remote from solid surfaces such as the containing walls of the reaction chamber and the jets or tips of the burner used for admitting the gases into the furnace. In these prior art processes, it has been demonstrated that crystals of titanium oxide form and grow on these solid surfaces and in such cases the crystals tend to have a coarse grain size or particle size larger than that which is required or is desirable for the production of a suitable pigment. It is well known in general pigment manufacture, and particularly in titanium oxide manufacture, that there is an optimum particle size range which has often been associated with the wavelength of light; if this particle size is increased above the optimum range, the tinting strength or hiding power of the pigment is very strongly and adversely affected.

There are other undesirable features associated with large grain size which may in certain circumstances be due to grittiness and lack of gloss when incorporated in suitable paint or other similar media. Also, large grain sizes accentuate the abrasive nature of the titanium oxide and grinding machinery is frequently eroded or scratched with not only consequent large wear and tear of the machinery itself, but a strong discolouration of the product due to metal contamination or other material of construction inadvertently incorporated. The growth of the crystals on solid surfaces may sometimes be attached with a comparatively strong bond and such growths may be extensive both on the walls of the reaction chamber and also on the burner jet and may cause undesirable obstructions in the apparatus.

Also in the prior art the gases are usually admitted into a large chamber through a burner or jet type device comprising one or more orifices or controlled openings through which the gases required for the reaction are injected into the furnace either unidirectionally through a straight burner, where all the gases are premixed, or in opposing streams where the gases are played one into the other or in concentric streams wherein the gases are led in one direction so as to give a varying degree of diffused reaction preferably taking place at a point remote from the burner. In some cases it has been found that the burners have to be limited in size and that varying twirling or swirling motions are imparted to the gases as they leave the burner, and in some further cases it has even been suggested that a plurality of special type burners in a nest is desirable to obtain the necessary characteristics of the desired pigment. It will be noted that these types of burners tend to be limited in size and are frequently only suitable for small scale work unless, as in the last case described, they are multiplied in the form of a nest; even in the latter case there is difficulty to enlarge for full scale plant when employing such undesirable and complicated burner constructions.

It is an object of the present invention to provide a process for the manufacture of titanium oxide from titanium tetrachloride which obviates or minimizes the above disadvantages.

According to this invention titanium dioxide is prepared by establishing a fluidized bed of solid inert particles, maintaining the temperature of the bed sufficiently high to cause titanium tetrachloride and oxygen to react with oxygen while introducing titanium tetrachloride and oxygen into the bed thus causing production of titanium dioxide and carrying titanium dioxide which has been produced in this manner away from the bed with the gases leaving the bed.

In a typical embodiment of this invention, titanium tetrachloride and air or other oxygen containing gases are reacted together under fluidized bed reaction conditions in the presence of material as hereinafter defined having a particle size of from approximately $40\mu$ to $1000\mu$ comprising the fluidized bed.

The material comprising the fluidized bed referred to above is in a form which would fluidize in an air stream at a temperature of 1000° C. for 100 hours at a velocity five times the minimum fluidizing velocity and the amount of dust and fine material carried away in suspension in the emerging air stream would not exceed five percent (preferably one percent or below) of the material originally present in the bed.

The preferred material comprising the fluid bed will be solid particles large in total area but small in continuity which are capable of being substantially maintained in a fluidized condition. The selection of solid surfaces to be used for the fluidized bed will be related to various characteristics which will include resistance to attack under the conditions of operation, comparatively high bulk density which is associated usually with massive rock formation usually found in sandy materials, and the relative hardness of the material selected and the range of particle size which is determined as stated above by the ability to fluidize satisfactorily. Surfaces which have been found suitable are silica, alumina, zircon and rutile which are preferably selected from mineral sources having undergone treatment where necessary by chlorine at high temperature in order to remove any undesirable impurities which might otherwise be attacked during the oxidation reaction and thereby contaminate the product. The above selection is not by any means exclusive as any material will suffice within the test given above.

The fluidizing velocity may vary from the minimum fluidizing velocity depending upon the density and particle size of the material comprising the fluidized bed to ten times the minimum velocity.

The reaction chamber in which the oxidation takes place consists essentially of a shaft furnace having as base a perforated plate with preferably porous diaphragms or other suitable device above the perforations to allow the passage of gas upward but to prevent the passage of solid through the plate. Above the plate is a bed of the sand-type material selected to constitute the fluidized bed, and into this bed, preferably through the perforated plate, air or oxygen or oxygen-containing gases are fed so as to maintain the bed in a "fluidized" condition. Meanwhile, admixed with the oxygen-containing gases or fed through a separate port through part of the perforated plate or by admission above the bed, or from the top or side of the chamber to just above the base of the bed through a tube jet, the titanium tetrachloride vapour or liquid to be oxidised may be injected.

The method is particularly applicable to the production of titanium oxide either in the form of anatase or in the form of rutile by the reaction of titanium chloride vapour with oxygen, the sand serving in its fluidised condition to function as a gas mixing device for the dispersion of the reacting gases, and, at the same time, for the maintenance of the product in a dispersed state so that it may be conveyed from the furnace suspended in the gases discharged therefrom. The chamber above the perforated plate both in the fluid bed zone and above may be externally heated or may be in the form of a well insulated shaft furnace to which external auxiliary heat may be supplied if necessary. Located near the top of this chamber is a port for the discharge of the gases from the reaction containing the product titanium oxide in suspension. These gases are led to cyclones or other well known suitable apparatus for separating the suspended titanium oxide from the gases which latter are then treated for recovery of chlorine by well known means prior to discharge to atmosphere or, alternatively, the chlorine containing gases may be used in the chlorination of titanium bearing ores or other suitable purposes wherein chlorine purification may not be necessary. The chamber and ancillary equipment including perforated plate, ports and ducting are constructed in well known refractory materials resistant to chlorine at the reaction temperature.

The sand forming the bed above the perforated plate has a depth which is determined by the detention time required for a constant rate of feed of the gas per unit area; the cross sectional area of the bed is consequently proportional to the output required. The gases fed through the perforated plate may consist of oxygen or oxygen-containing gases, such as air, which may be fed through part or all of the plate area. In the former case, the other part will feed titanium tetrachloride vapour separately introduced, so that the titanium tetrachloride vapour and oxygen containing gases contact and are distributed and react within the fluid bed. As a further alternative the titanium tetrachloride and oxygen gases may be pre-mixed at temperatures below 500° C. and the mixture fed through the perforated plate. As a still further alternative the oxygen containing gases may be fed through the perforated plate and the titanium tetrachloride may be injected into the reaction chamber either by dropping liquid titanium tetrachloride on to the bed but preferably within the bed (i. e. just above the perforated plate), or it may be injected in gaseous form into the bed preferably through the side by means of a tube, the exit of which is located within the bed and just above the perforated plate. The temperature at which titanium tetrachloride is admitted may determine the optimum conditions required.

The reaction between the titanium tetrachloride and oxygen is exothermic and, with a well insulated furnace, the heat generated by the reaction may suffice. However, it may be desirable to admit other fuel gases as for instance, carbon monoxide either admixed with titanium tetrachloride or separately admitted in one of the alternative methods given above such as the separate addition below the plate, or by separate addition through a suitable port of entry, the exit of which is within the bed and preferably close to the perforated plate. By this means auxiliary heat is supplied by the reaction of carbon monoxide or other fuel with the oxygen constituent to attain the temperature required for the reaction of the titanium chloride with oxygen.

The construction of the perforated plate used in this invention may follow any well known pattern normally suitable for admitting gases upwards into a fluid bed. A preferred form is that in which the pressure drop across the plate approximates to the pressure drop through the bed. In this design controlled orifices are inserted into the perforations preferably on the under side of the plate and a disc or gas permeable diaphragm is inserted preferably at the top of each perforation so as to allow upward flow of the gas but prevent the return flow of dust or other undesirable solid material from entering either the perforation or the gas chamber below the plate. The provision of this type of construction in the perforated plate enables additionally a uniform gas distribution by use of the orifices which because of their position are unlikely to become over-heated, or obstructed, and may furthermore be easily detached for examination without removal of the plate. Also as indicated above the perforated plate may be partitioned on the under side so that gases such as oxygen gases, or vapour of titanium tetrachloride, carbon monoxide or other fuel gases may be separately admitted in the bed and by virtue of the partitioning the various gas inlets may be so distributed that on entering the bed above speedy and intimate admixture is assured.

For the production of anatase, the range of temperature is 700 to 1200° C. and the preferred range is 800 to 950° C. and this temperature may be initiated by prior burning of the carbon monoxide or other fuel gas with oxygen before the titanium tetrachloride is introduced.

The ratio of titanium tetrachloride to oxygen may range from 1:0.2 to 1:3; if auxiliary heating is employed, the carbon monoxide and oxygen will be proportioned in the ratio $2CO:O_2$ and if necessary the oxygen required to react with the carbon monoxide may be admitted in proximity to the carbon monoxide, but preferably within the bed. The proportion of oxygen and the oxygen containing gases relative to the titanium tetrachloride is selected primarily to yield the product most suitable, but wherever possible the lower the proportion of oxygen to titanium tetrachloride, the stronger will be the concentration of chlorine generated and the greater the economy in recovery of chlorine, i. e. the more suitable will the gas mixture be for re-use in chlorination operations without special techniques for chlorine separation.

The time of contact of the gases within the chamber will be important, not only in regard to the completion of the reaction $TiCl_4+O_2=TiO_2+2Cl_2$, but also in regard to the nature of the product produced. Thus, where the time of contact is relatively short, a high temperature will be required, whereas with a long time of contact, lower temperatures will suffice. In the event of a long time contact at a high temperature, the tendency will be for the anatase form of $TiO_2$ to transform to rutile.

In the production of titanium oxide in the rutile form, the conditions will be similar to the above, the temperature will vary from 700° C. to 1200° C. (preferably 800 to 1100° C.) depending on the time of contact.

Following is a description by way of example of a method of carrying the invention into effect.

*Example 1*

A silica tube 5" diameter 36" long was mounted vertically in an electrically wound furnace. Into the tube was affixed a porous disc of silica which was cemented in the tube so as to provide a perforated base on which the fluid bed was to be supported. The lower part of the tube was sealed with two inlet tubes, one which supplied the oxygen gas fed into the chamber below the porous disc, the other provided the titanium tetrachloride feed and passed upward through the disc and was bent in the form of a swan-neck so that the upper part of the neck was above the level of the fluidized bed; following the bend the titanium tetrachloride feed tube returned to a point immediately above the porous disc terminating in a restricted end functioning as a nozzle where the velocity of the gas prevented undue introduction of fluidized silica sand into the tube. The upper part of the tube was also sealed and through the cap a port was located to lead the reaction products to suitable receivers. Also passing through the cap was a silicon tube into which could be inserted a pyrometer, the junction of which was located within the fluidized zone. Provisions were made for metering the titanium tetrachloride liquid fed to the apparatus by means of a rotameter and a suitable meter was installed for proportioning the oxygen supply. The fluid bed consisted of a silica sand having a grain size of 250μ to 350μ so as to fill the tube above the porous disc to a static height of 7".

The bed was heated to a temperature of 920° C. whilst maintained in a fluidized state by the admission of oxygen gas at the rate of 12 litres per minute. With the bed so prepared titanium tetrachloride was admitted at the rate of 0.18 mol per minute and the oxygen feed was adjusted so that the molar ratio of titanium tetrachloride to oxygen was 1:3, the temperature meantime being maintained at 920° C. The reaction was practically immediate and the time of contact in the fluid bed zone was approximately 2 seconds. The time of operation was 35 minutes. At least 99.9% of the titanium tetrachloride was converted. The product obtained was a pure $TiO_2$ 93% being in the anatase form, and had excellent pigment properties when assessed according to its tinting strength and colour. On examining the furnace after the experiment was completed there was no sign of any titanium oxide growth on the walls or the inlet tube.

*Example 2*

An apparatus similar to that employed in Example 1 was used except that the vertical tube was 2" in diameter, the other conditions including the static bed height of 7" and the quality of the silica sand were the same. The bed fluidized by oxygen was preheated to a temperature of 910° C. and whilst maintaining this temperature the titanium tetrachloride was fed in at the rate of 5 cc. per minute the oxygen rate being controlled to give a molar ratio of titanium tetrachloride to oxygen of 1:1.8. The reaction was immediate and practically complete, that is at least 99.9% of the titanium tetrachloride was converted. The time of the operation was 30 minutes. The product was a pure $TiO_2$ of which 96% was in the anatase form. It had excellent pigment properties when assessed for tinting strength and colour.

We claim:

1. A method of preparing titanium dioxide which comprises establishing a fluidized bed comprising inert particles having a particle size of approximately 40 microns to 1000 microns, introducing titanium tetrachloride and oxygen into the bed and maintaining the temperature of the bed sufficiently high to cause the titanium tetrachloride and oxygen to react to produce titanium dioxide and carrying evolved titanium dioxide from the bed with the gases leaving said bed.

2. A process as claimed in claim 1 wherein the material comprising the fluidized bed is silica.

3. A process as claimed in claim 1 wherein the material comprising the fluidized bed is selected from the group consisting of alumina, silica zircon and rutile.

4. A process for the manufacture of titanium dioxide by the oxidation in the vapor phase of titanium tetrachloride wherein the tetrachloride vapor is reacted with gaseous oxygen within a bed of solid particles selected from the group consisting of particles of zircon, silica, alumina, and titanium dioxide, and maintained in a fluidized condition at a temperature within the range of 750 to 1200° C., and at least the greater part of the titanium dioxide formed is carried away with the gases leaving the fluidized bed.

5. A process for the manufacture of titanium dioxide by the oxidation in the vapor phase of titanium tetrachloride wherein the tetrachloride vapor is reacted with gaseous oxygen within a bed of titanium dioxide particles maintained in a fluidized condition at a temperature of 750 to 1200° C., and at least the greater part of the titanium dioxide formed is carried away with the gases leaving the fluidized bed.

6. A process for preparing titanium dioxide which comprises establishing a fluidized bed of solid inert particles maintaining the temperature of said bed sufficiently high to cause titanium tetrachloride to react with oxygen while introducing titanium tetrachloride and oxygen into said bed whereby titanium dioxide is formed and carrying titanium dioxide thus produced away with the gases leaving the fluidized bed.

7. The process of claim 6 wherein the particles are selected from the group consisting of zircon, silica, alumina and titanium dioxide.

8. The process of claim 6 wherein air is introduced into said bed.

References Cited in the file of this patent

UNITED STATES PATENTS

| | | |
|---|---|---|
| 2,020,431 | Osborne et al. | Nov. 12, 1935 |
| 2,450,156 | Pechukas | Sept. 28, 1948 |
| 2,488,439 | Schaumann | Nov. 15, 1949 |
| 2,541,495 | Buchanan | Feb. 13, 1951 |

FOREIGN PATENTS

| | | |
|---|---|---|
| 698,159 | Great Britain | Oct. 7, 1953 |

OTHER REFERENCES

"Flow in Fluidized Reaction Systems" by Gordon Kidoo, May 1949, Chem. Eng., pages 112–114.

"Fluidizing Processes," Chem. Eng. Progress, vol. 43, No. 8, pages 429, 433–436.